(12) United States Patent
Chen et al.

(10) Patent No.: US 6,320,703 B1
(45) Date of Patent: Nov. 20, 2001

(54) ULTRA-WIDE FIELD OF VIEW CONCENTRIC SENSOR SYSTEM

(75) Inventors: Chungte W. Chen, Irvine; J. Steve Anderson, Santa Monica, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/413,985

(22) Filed: Oct. 7, 1999

(51) Int. Cl.⁷ .............. G02B 13/04; G02B 9/00; H01J 40/14
(52) U.S. Cl. .......... 359/753; 359/796; 250/207; 250/214 VT
(58) Field of Search .................. 359/725, 733, 359/735, 753, 754, 796, 797, 738, 664; 250/207, 214 VT

(56) References Cited

U.S. PATENT DOCUMENTS

| | | | |
|---|---|---|---|
| 4,184,749 | 1/1980 | Grossman | 359/722 |
| 4,679,912 | 7/1987 | Loy | 359/645 |
| 5,004,328 | * 4/1991 | Suzuki et al. | 349/664 |
| 5,311,611 | 5/1994 | Migliaccio | 385/120 |
| 6,097,545 | * 8/2000 | Vaughan | 359/637 |
| 6,233,100 | * 5/2001 | Chen et al. | 359/727 |

\* cited by examiner

*Primary Examiner*—Georgia Epps
*Assistant Examiner*—David N. Spector
(74) *Attorney, Agent, or Firm*—Colin M. Raufer; Leonard A. Alkov; Glenn H. Lenzen, Jr.

(57) ABSTRACT

Very compact, high numerical aperture, high resolution, ultra-wide field of view concentric optical apparatus. The concentric optical apparatus comprises a concentric lens and a focal surface array disposed along a focal surface of the concentric shell outer lens. The optical apparatus may further comprise an image intensifier tube optically coupled to the concentric lens by way of a curved fiber optic relay having an input surface that is concentrically disposed with respect to the concentric lens. The optical apparatus may also comprise a dewar that houses the focal surface array, and wherein the concentric lens comprises a cold stop for the focal surface array.

17 Claims, 2 Drawing Sheets

ULTRA-WIDE FIELD OF VIEW CONCENTRIC SENSOR SYSTEM

GOVERNMENT RIGHTS

This invention was made with Government support under Contract No. N66001-98C-8622 awarded by the Department of the Navy. The government has certain rights in this invention.

BACKGROUND

The present invention relates generally to electro-optical sensor systems, and more particularly, to ultra-wide field of view concentric electro-optical sensor systems.

Most currently used sensor architectures employ a multiple field of view optical system with a focal surface array located at an image plane to receive radiation from an image scene. A high resolution narrow field of view telescope performs tracking and identification functions. For searching and acquisition mode, a wide field of view attachment is flipped into the narrow field of view telescope to increase the field of view coverage. The sensor is mounted on a gimbal system to cover the entire field of regard. Unfortunately, such systems are relatively bulky and complex because of the moving mechanisms used therein, and which generally has a very tight tolerance margin and is potential source of failure.

Accordingly, it is an objective of the present invention to provide for ultra-wide field of view concentric electro-optical sensor systems that improve upon conventional systems.

SUMMARY OF THE INVENTION

The drawbacks associated with prior art systems may be overcome by a sensor constructed in accordance with the principles of the present invention, and which is a very compact, high numerical aperture, high resolution, ultra-wide field of view (FOV) concentric optical sensor. The concentric optical sensor comprises a concentric lens having an aperture stop at its center, and a curved focal surface array concentrically disposed around a portion of the concentric lens centered upon the center of the aperture stop.

The present invention also provides for a concentric refractive lens system having a concentric air lens that serves as a cold stop. The optical elements following the concentric air lens are enclosed inside a dewar containing the focal surface array. The present invention also provides for an image intensifier employing a concentric lens as an objective lens to achieve low F-number and wide field of view coverage.

The concentric lens provides very high image quality for f-numbers faster than 1.0 and a field of view coverage of up to 180 degrees. The overall size of the sensor is about two times its effective focal length EFL). Compared to a fisheye lens that provides for a 120 degrees field of view, the size of the overall fisheye lens is at least 6 times its effective focal length. The total volume of the fisheye lens is at least 20 times that of the comparable concentric lens used in the present sensor. Additionally, the f-number of a fisheye lens is at least two times slower than that of the concentric lens used in the present sensor.

The focal surface array may be a curved and concentric with respect to the center of the concentric lens. The focal plane array may be coplanar with detector elements distributed along a ring centered around the optical axis of the sensor. The focal plane array may include multiple stripes concentric with respect to the center of the concentric lens.

BRIEF DESCRIPTION OF THE DRAWINGS

The various features and advantages of the present invention may be more readily understood with reference to the following detailed description taken in conjunction with the accompanying drawings, wherein like reference numerals designate like structural element, and in which.

DETAILED DESCRIPTION

Figure 1:
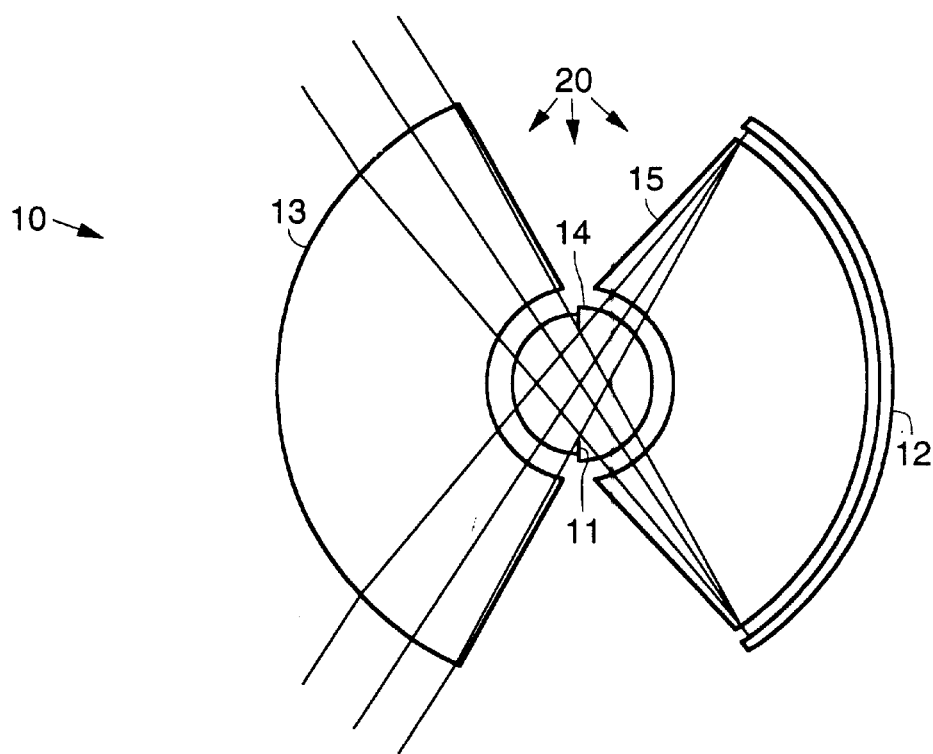
FIG. 1 illustrates a cross-sectional side view of an exemplary very compact, high numerical aperture, high resolution, ultra-wide field of view concentric optical sensor in accordance with the principles of the present invention.

Referring to the drawing figures, FIG. 1 illustrates a cross-sectional side view of an exemplary very compact, high numerical aperture, high resolution, ultra-wide field of view concentric optical sensor 10 in accordance with the principles of the present invention. The ultra-wide field of view concentric optical sensor 10 comprises two primary elements. These are a concentric lens 20 having a centrally located aperture stop 11, and a focal surface array 12 that is concentrically disposed around a portion of the concentric lens 20. The focal surface array 12 is preferably curved, and may have a variable pixel density (or detector element density).

The concentric lens 20 comprises a front shell lens 13, a central ball lens 14 and a rear shell lens 15. The thicknesses of the front and rear shell lenses 13, 15 may vary from application to application. There is an air gap between the central ball lens 14 and the front and rear shell lenses 13, 15.

Figure 2:
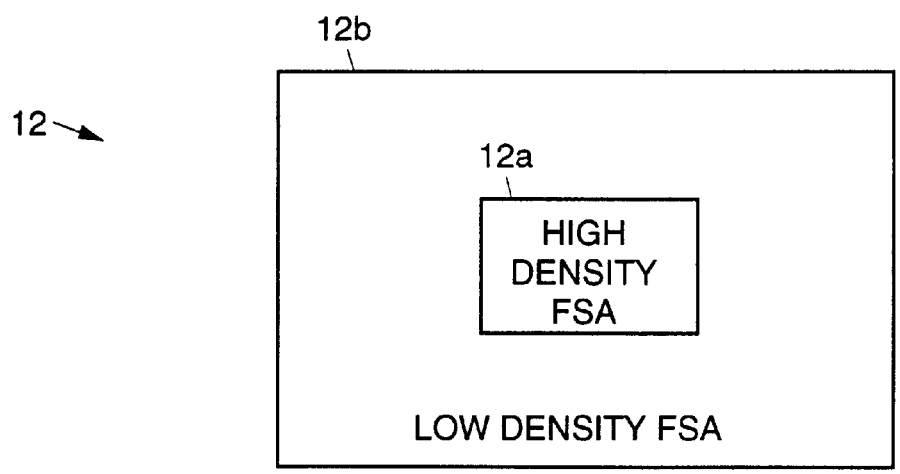
FIG. 2 illustrates a variable density focal surface array that may be used with the present sensor.

Utilizing a variable pixel density focal surface array 12, the concentric lens 20 can simultaneously perform acquisition and tracking functions. FIG. 2 illustrates a variable pixel focal surface array 12, where the pixel density of a central region 12a of the focal surface array 12 is very high for tracking or identification, and an outer low density region 12b of the focal surface array 12 provides for acquisition or search. However, it is to be understood that the present invention is not limited to multiple density detector arrays. A single or uniform density detector array 12 may be used with the sensor 10.

In conjunction with a very high density focal surface array 12, the sensor 10 can perform identification functions. By providing a read-out scheme for the focal surface array 12 that has a high resolution capability for the central portion of the field of view and lower resolution in the outer field of view, the sensor 10 can perform both target acquisition and identification functions. The large numerical aperture capability associated with the sensor 10 is particularly suitable for either a very low light level sensor such as an image intensifier or an uncooled infrared sensor, for example.

Since the concentric lens 20 is capable of very wide field of view coverage and low F-number, it can perform both tracking and identification functions. The variable density focal surface array 12 reduces the signal processing load. An alternative to a variable density focal surface array 12 is a high density focal surface array 12 with outer pixels binned together in either a 4×4 or an 8×8 arrangement, for example.

Conventional image intensifiers have been widely deployed as night vision equipment for pilots, drivers and soldiers. The conventional image intensifier operates in extremely low light level conditions and has a wide field of view. The objective lens of a conventional image intensifier is an inverse telephoto lens having an F-number faster than 1.2. The objective lens generally has more than eight lenses and an aspheric lens or lenses. Therefore, the size of the objective lens of the conventional image intensifier is very bulky, heavy and expensive. Since the conventional image intensifier is primarily a helmet mounted device, the heavy and bulky nature presents a tremendous burden to users. The unique optical properties (such as wide field of view and low F-number) of the concentric lens 20 and sensor 10 are particular suitable for image intensifier applications.

Figure 3:
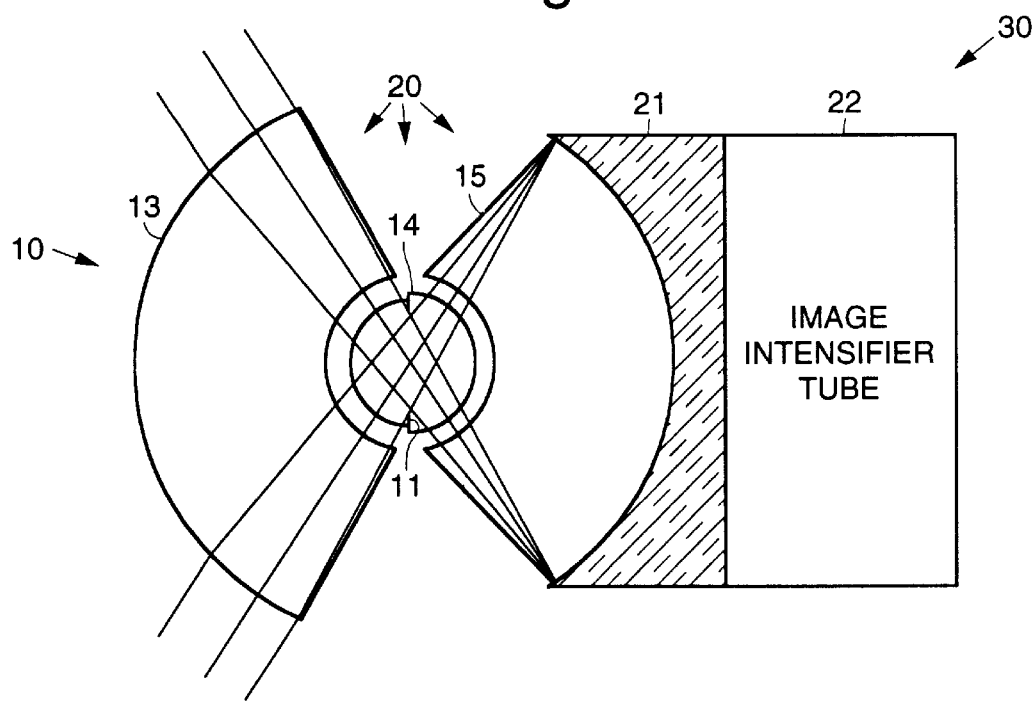
FIG. 3 illustrates a cross-sectional side view of an exemplary sensor including an image intensifier.

FIG. 3 illustrates a cross-sectional side view of an exemplary embodiment of an image intensifier 30 employing a concentric lens 20 in accordance with the present invention. The image intensifier 30 comprises the concentric lens 20 with a centrally located aperture stop 11, and an image intensifier tube 22 optically coupled to receive light related by way of the concentric lens 20 using a curved fiber optic relay 21 that has an input surface 23 that is concentrically disposed with respect to the center of the concentric lens 20.

In the image intensifier 30, the light that is imaged by the concentric lens 20 onto the curved fiber optic relay 21 is coupled to the image intensifier tube 22. The curved fiber optic relay 21 may comprise a plurality of strands of fiber optic cable that couple the light to the image intensifier 22, which amplifies the signals for subsequent viewing.

The incoming radiation is focused on the curved fiber optic relay 21 to write to the image intensifier tube 22. Since the concentric lens 20 and curved fiber optic relay 21 have spherical surfaces, the image intensifier 30 is very easy to fabricate and assemble. The compactness associated with using the concentric lens 20 is particular beneficial in reducing the moments of initial of the image intensifier 30.

Figure 4:
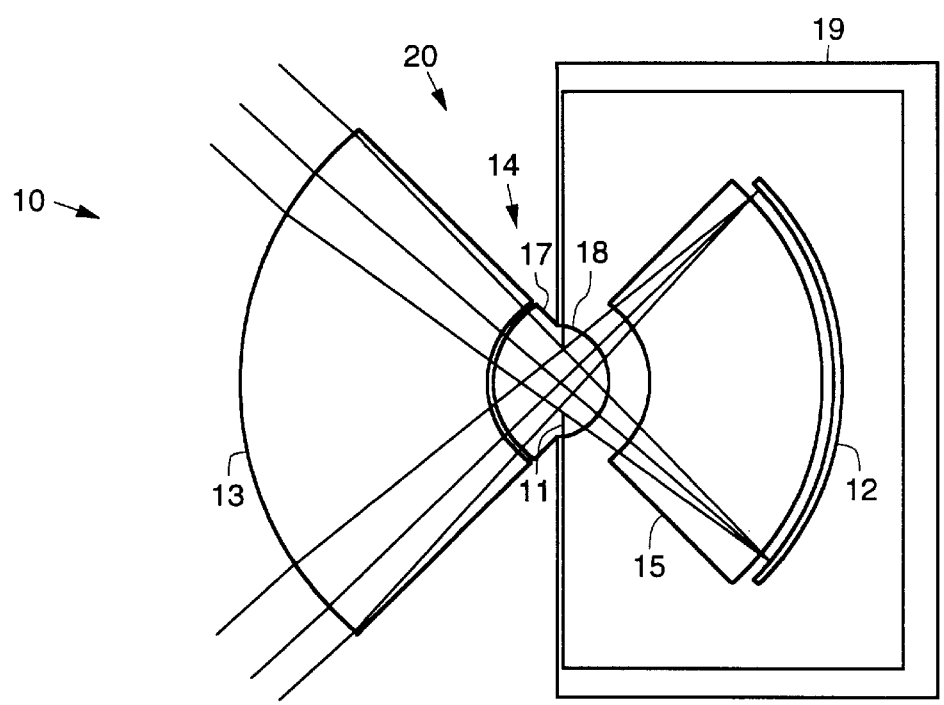
FIG. 4 illustrates comprising an integrated concentric lens imager and detector assembly employing the present sensor.

In many conventional high quality infrared sensors, a cold stop in front of a detector array is necessary to reduce background noise. A similar arrangement using the concentric lens 20 in accordance with the present invention is shown in FIG. 4. The sensor 20 shown in FIG. 4 comprises an integrated concentric lens 20 used as an imager, and a detector assembly comprising a dewar 19 that houses a focal surface array 12.

The concentric lens 20 comprises a front shell lens 13, a central ball lens 14 comprising input and output lenses 17, 18 that sandwich an aperture stop 11, and a rear shell lens 15. The front shell lens 13 is separated from the third lens 17 by an air gap. The rear shell lens 15 is also separated from the output lens 18 by an air gap. The output lens 18, the rear shell lens 15, and a focal surface array 12 are disposed within the dewar 19. The present sensor 10 comprising the concentric lens 20 and the focal surface array 12 may thus be used as a common imager module for many sensor applications.

The focal surface array 12 can have a number of different structures. The focal surface array 12 may be a curved focal surface array 12 that is concentrically disposed with respect to the center of the concentric lens 20. The focal surface array 12 may also use any spherical arrangement of detector elements. For example, the focal surface array 12 may be comprised of multiple stripes that are concentrically disposed with respect to the center of the concentric lens 20. The focal surface array 12 has a center of curvature in the proximity of the center of the aperture stop 11.

The field of view coverage of the concentric scanning optical sensor 10 may be as large as 180 degrees. Notwithstanding this, the volume of the sensor 10 is approximately two orders of magnitude smaller than that of a corresponding fisheye lens system. The large field of view capability is ideal for many target acquisition sensor applications.

The sensor 10 has an overall length approximately equal to two times its effective focal length. More importantly, the optical elements are spherical in shape, and the image quality is practically diffraction-limited across the entire field of view.

The concentric optical sensor 10 has broad applications for use in sensor systems manufactured by the assignee of the present invention. The high numerical aperture, wide field of view and ultra-compact package provided by the sensor 10 is particularly suitable for uncooled focal surface array applications.

In view of the above, the present invention provides for a multi-function sensor system comprising a refractive optical element (concentric lens 20) and curved focal surface array 12, where the curved focal surface array 12 is concentrically disposed around the refractive concentric lens 20. The present invention provides for a concentric refractive lens system having an air gap that serves as a cold stop. The optical elements following the concentric lens 20 are enclosed inside a dewar 19 housing the focal surface array 12. The present invention also provides for an image intensifier 30 employing a concentric lens 20 as an objective lens to achieve low F-number and wide field of view coverage.

The curved focal surface array 12 may have a variable pixel density, wherein an outer portion 12b of the array 12 has low pixel density to provide for searching and identification, and a central portion 12a has high pixel density for tracking and identification. The focal surface array 12 may have the outer portion 12b binned in 2×2 or 4×4 clusters to provide for searching and identification, and the central portion 12a, without binning, providing for tracking and identification. The pixels of the curved focal surface array 12 may be binned throughout most of the array 12 for searching and identification, and a small portion of the array 12, without binned pixels, provides for tracking and identification. The non-binned portion of the focal surface array 12 can be in any part of the array 12, whose output is controlled by readout software or other means.

Thus, ultra-wide field of view concentric electro-optical sensor systems have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Ultra-wide field optical apparatus comprising:
   a concentric sensor comprising:
      a concentric lens that comprises a front shell lens, a central ball lens, and a rear shell lens and air gaps between adjacent surfaces of the front, central and rear lenses; and
      a focal surface array con centrically disposed around a portion of the concentric lens.

2. The optical apparatus recited in claim 1 wherein the concentric lens has a centrally located aperture stop.

3. The optical apparatus recited in claim 1 wherein the focal surface array is curved.

4. The optical apparatus recited in claim 1 wherein the focal surface array has a variable pixel density.

5. The optical apparatus recited in claim 1 wherein the focal surface array has a uniform pixel density.

6. The optical apparatus recited in claim 1 wherein the pixel density of a central region of the focal surface array is very high for tracking or identification, and an outer low density region of the focal surface array provides for acquisition or search.

7. The optical apparatus recited in claim 1 wherein the focal surface array comprises outer and inner pixels and has the outer pixels binned together.

8. The optical apparatus recited in claim 1 wherein the focal surface array comprises outer and inner pixels and has the outer pixels binned together in a 4×4 arrangement.

9. The optical apparatus recited in claim 1 wherein the focal surface array comprises outer and inner pixels and has the outer pixels binned together in a an 8×8 arrangement.

10. The optical apparatus recited in claim 1 wherein the focal surface array comprises outer and inner pixels and h as the inner pixels binned together in a 4×4 arrangement.

11. The optical apparatus recited in claim 1 wherein the focal surface array comprises outer and inner pixels and has the inner pixels binned together in a an 8×8 arrangement.

12. The optical apparatus recited in claim 1 further comprising:
an image intensifier tube optically coupled to the concentric lens by way of a curved fiber optic relay having an input surface that is concentrically disposed with respect to the concentric lens.

13. The optical apparatus recited in claim 1 further comprising:
a dewar that houses the focal surface array, and wherein the concentric lens comprises a cold stop for the focal surface array.

14. The optical apparatus recited in claim 1 wherein the focal surface array comprises multiple stripes that are concentrically disposed with respect to the center of the concentric lens.

15. Ultra-wide field optical apparatus comprising:

a concentric sensor comprising:

a concentric lens comprising a front shell lens, a central ball lens, and a rear shell lens; and a focal surface array concentrically disposed around a portion of the concentric lens, and wherein the pixel density of a central region of the focal surface array is very high for tracking or identification, and an outer low density region of the focal surface array provides for acquisition or search.

16. Ultra-wide field optical apparatus comprising:

a concentric sensor comprising:

a concentric lens comprising a front shell lens, a central ball lens, and a rear shell lens, and wherein the concentric lens comprises a cold stop for the focal surface array;

a focal surface array concentrically disposed around a portion of the concentric lens; and a dewar that houses the focal surface array.

17. Ultra-wide field optical apparatus comprising:

a concentric sensor comprising:

a concentric lens comprising a front shell lens, a central ball lens, and a rear shell lens; and a focal surface array concentrically disposed around a portion of the concentric lens that comprises multiple stripes that are concentrically disposed with respect to the center of the concentric lens.

* * * * *